Oct. 15, 1929.  J. A. ANGLADA  1,731,285
SPEED TRANSFORMING MECHANISM
Filed Sept. 6, 1924  4 Sheets-Sheet 1
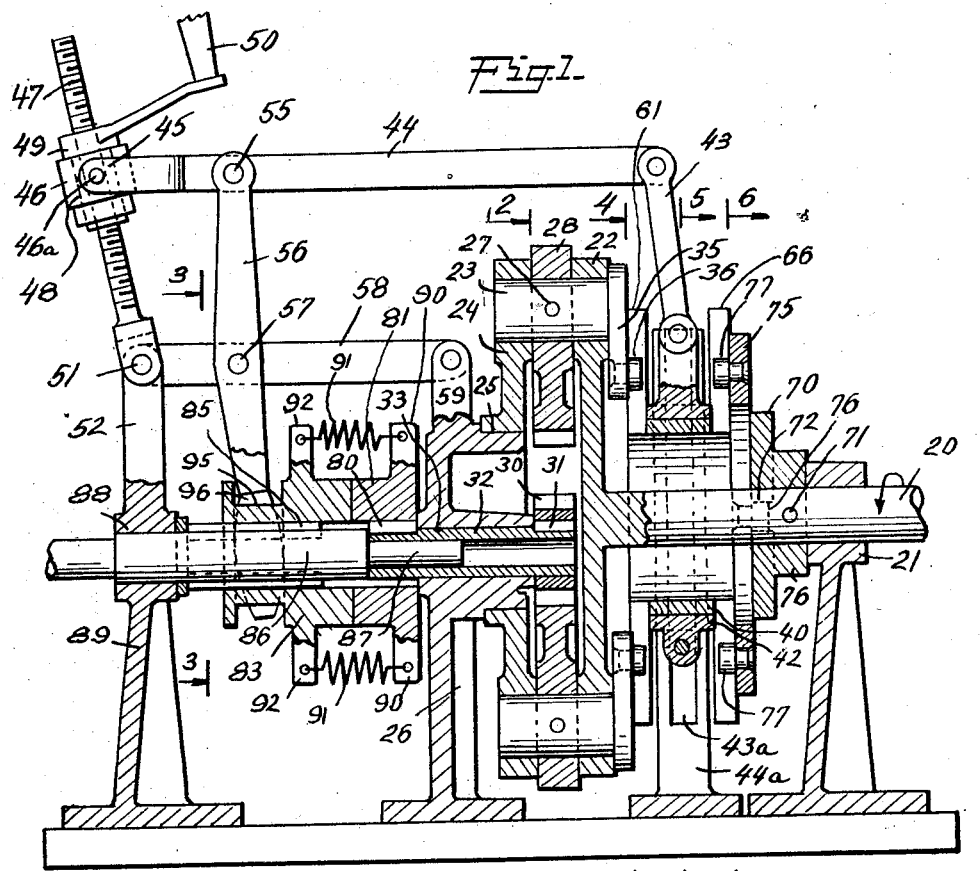
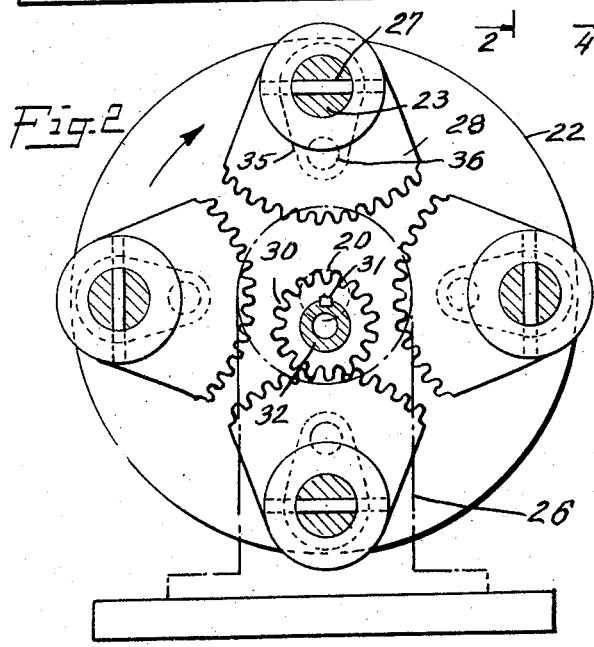
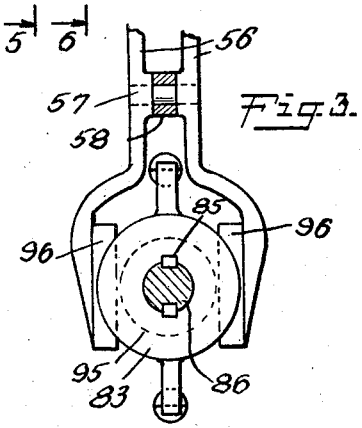
INVENTOR
Joseph A. Anglada
BY
Marshall & Hawley
ATTORNEYS.

Oct. 15, 1929.  J. A. ANGLADA  1,731,285
SPEED TRANSFORMING MECHANISM
Filed Sept. 6, 1924  4 Sheets-Sheet 2
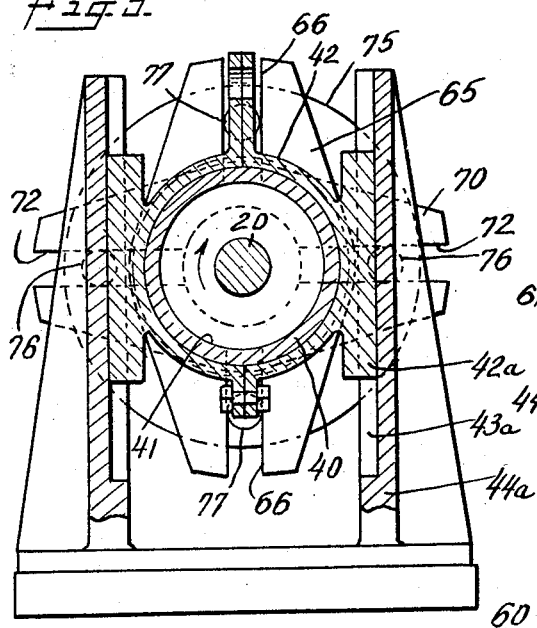
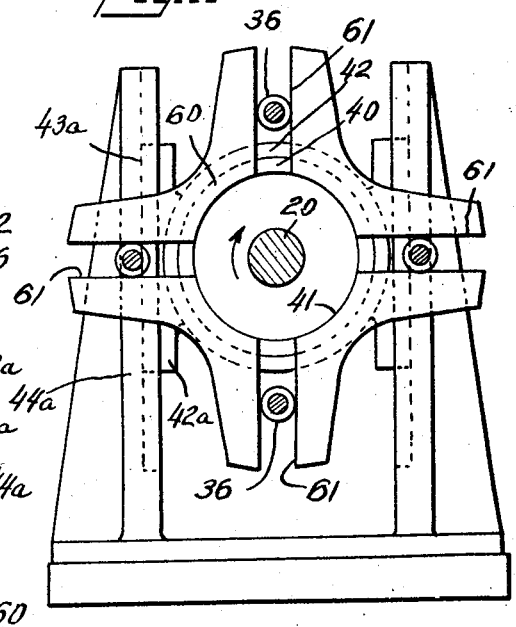
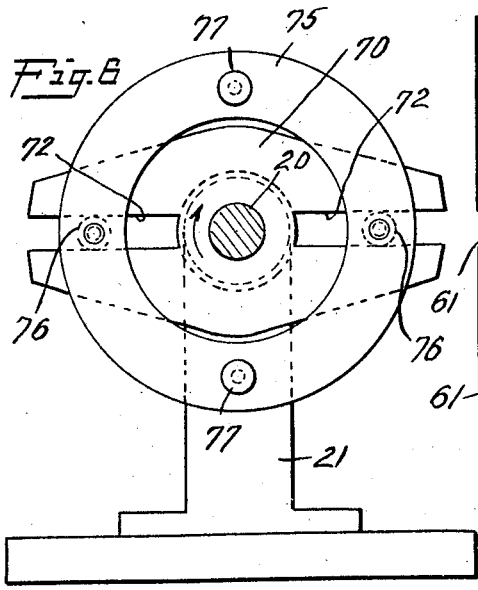
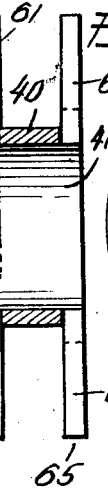
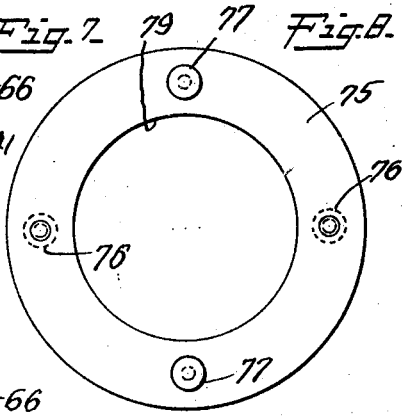
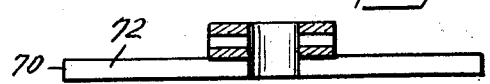
INVENTOR
Joseph A. Anglada
BY
Marshall + Hawley
ATTORNEYS.

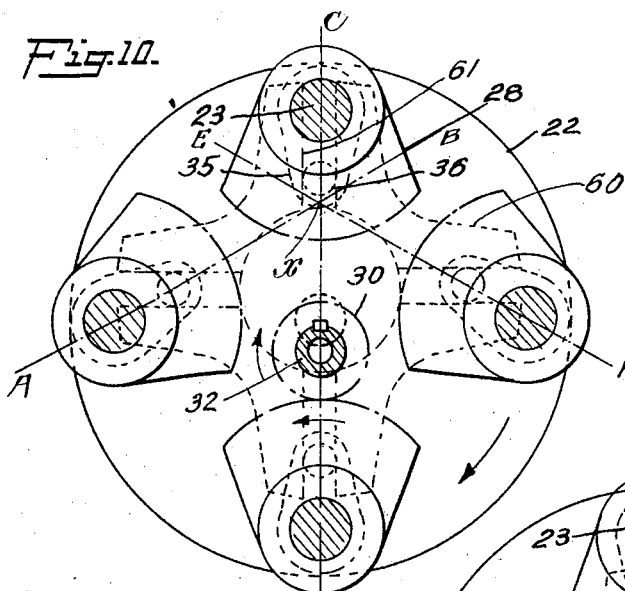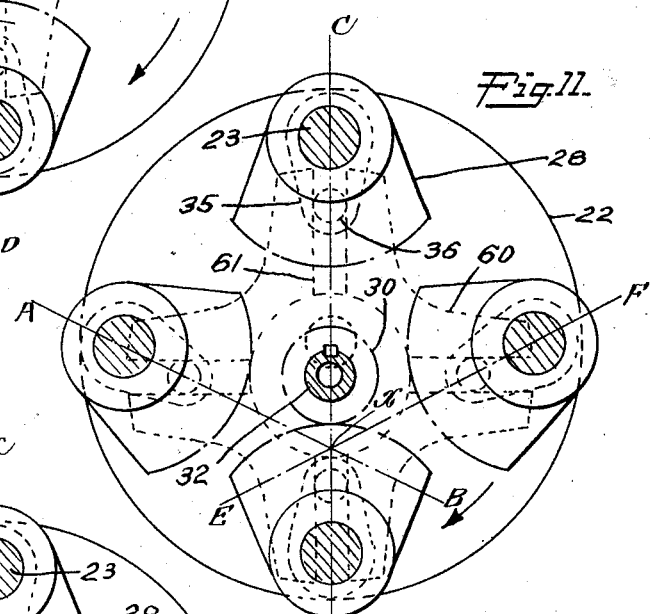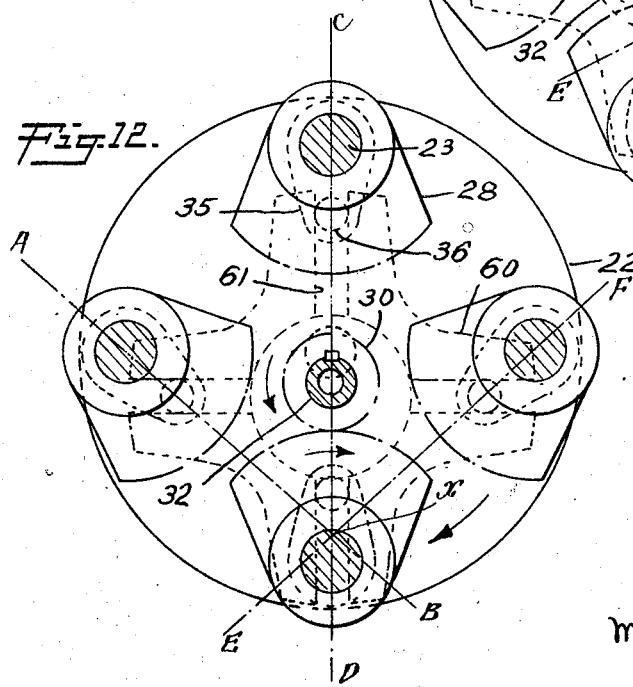

Oct. 15, 1929.  J. A. ANGLADA  1,731,285
SPEED TRANSFORMING MECHANISM
Filed Sept. 6, 1924  4 Sheets-Sheet 4
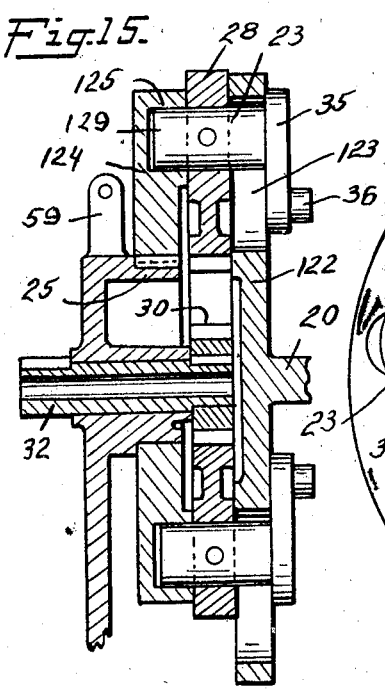
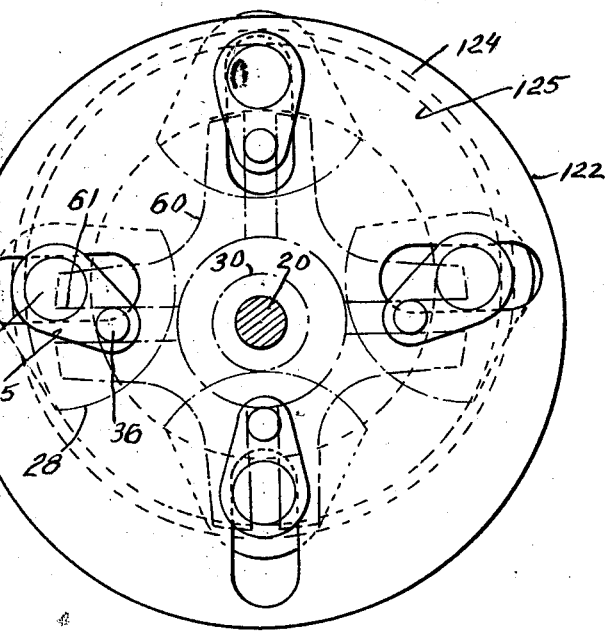
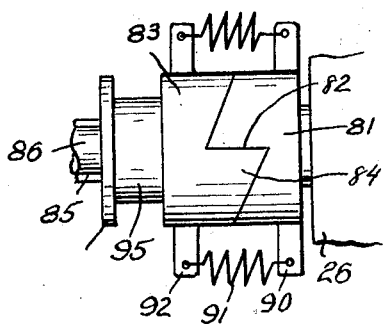
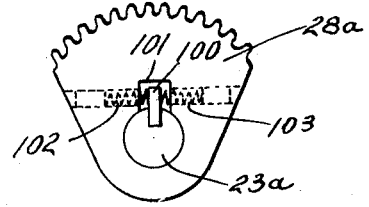
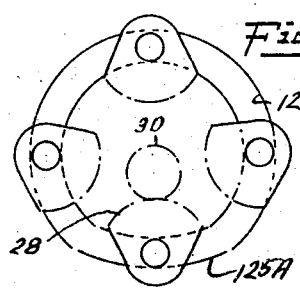
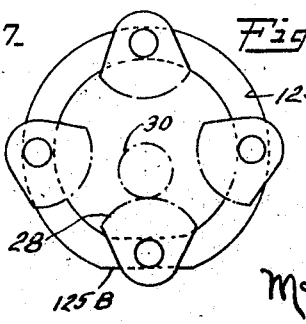
INVENTOR
Joseph A. Anglada
BY
Marshall & Hawley
ATTORNEYS.

Patented Oct. 15, 1929

1,731,285

UNITED STATES PATENT OFFICE

JOSEPH A. ANGLADA, OF JENKINTOWN, PENNSYLVANIA

SPEED-TRANSFORMING MECHANISM

Application filed September 6, 1924. Serial No. 736,218.

This invention relates to mechanical movements and, particularly, to speed transforming mechanism so constructed and arranged that a driven member may be operated at a speed higher or lower than the driving member.

As is well known, practically all of the change speed mechanisms heretofore devised provide for a limited number of speed changes and in changing from one speed to another, speed and driving effort are lost. Moreover, with most of such devices the change must be effected with considerable care and requires considerable skill since certain gears are thrown out of mesh and other gears are thrown into mesh.

This invention has for its salient object to provide mechanism by means of which any speed from zero to maximum can be readily and easily obtained by the manipulation of simple control means requiring no skill or care for its operation.

Another object of the invention is to provide speed transforming mechanism by means of which an infinite variety of speeds ranging from zero to maximum can be obtained at the will of the operator and without loss of driving effort or speed during the transitional period.

Another object of the invention is to provide mechanism of the character described by means of which the ratio of speed to torque is always maintained constant.

Another object of the invention is to provide speed transforming mechanism so constructed and arranged that the product of the torque times the speed is always constant or, in other words, as the speed increases, the torque correspondingly decreases and vice versa.

Another object of the invention is to provide speed transforming mechanism between a driving and driven member so constructed and arranged that the driven member can be driven at the same speed as the driving member, at higher speeds or lower speeds than the driving member, in the same direction or in the reverse direction, or will remain stationary while the driving member is being driven.

Another object of the invention is to provide a speed transforming mechanism by means of which an infinite variety of speed changes may be accomplished during the operation of the driving and driven member.

Further objects of the invention will appear from the following specification taken in connection with the drawings, which form a part of this application, and in which Fig. 1 is a sectional elevation showing one form of mechanism constructed in accordance with the invention.

Fig. 2 is a transverse sectional elevation taken substantially on line 2—2 of Fig. 1.

Fig. 3 is a sectional elevation taken substantially on line 3—3 of Fig. 1.

Figs. 4, 5 and 6 are sectional elevations taken substantially on lines 4—4, 5—5 and 6—6 of Fig. 1.

Fig. 7 is an elevational view of the vertically adjustable member by means of which the variations in speed are obtained.

Fig. 8 is an elevational view of a disk through which the rotation of the shaft is communicated to the member shown in Fig. 7.

Fig. 9 is a sectional elevation of a member which is pinned to the shaft and accomplishes the rotation of the disk shown in Fig. 8.

Figs. 10, 11 and 12 are diagrammatic elevational views showing different positions of adjustment of the speed transforming member, Fig. 10 showing the position for overdirect drive, Fig. 11 the position for zero drive of the driven member, and Fig. 12 showing the position for reverse drive.

Fig. 13 is an elevational view of the clutch connecting the pinion shaft and the shaft driven thereby.

Fig. 14 is an elevational view showing a resilient connection between one of the gear segments and its pivot shaft.

Fig. 15 is a sectional elevation of a modified form of the invention.

Fig. 16 is an elevational view, partly in section and taken at right angles to Fig. 15, and Figs. 17 and 18 are diagrammatic elevations showing modified forms of cams for guiding the segmental gear pivot pins.

The invention briefly described comprises a drive shaft, a driven shaft, a gear on the driven shaft and a plurality of gears carried by the drive shaft and adapted to successively mesh with the gear on the driven shaft and means for oscillating the gears carried by the drive shaft and speed transforming means for varying the amplitude of oscillation and the period of engagement of the gears carried by the drive shaft with the gear on the driven shaft. The device is so constructed and arranged that the drive from the drive shaft to the driven shaft can be changed during the operation of the gearing and in such a way as to operate the driven shaft at a higher or lower speed than the drive shaft and at an infinite variety of speeds. The driven shaft, moreover, can be driven in the same direction as the drive shaft, or in the reverse direction. Further details of the invention will appear from the following description.

In the embodiment of the invention illustrated in the drawings there is shown a drive shaft 20 supported in a bearing 21 and having a disk or spider 22 formed on or secured to one end thereof.

The disk or spider 22 has pivotally mounted therein a plurality of pins or spindles 23 located concentrically with the axis of rotation of the disk and at equally spaced intervals around the disk. The pins 23 are also rotatably mounted in a disk or spider 24 which in turn is rotatable on a bearing 25 in a supporting standard 26.

Each pin 23 has secured thereto as shown at 27 a gear or gear segment 28, these gear segments being disposed between the disks 22 and 24. The gear segments 28 are adapted to successively engage a common pinion 30 keyed as shown at 31 to a hollow shaft 32 mounted in a bearing 33 which in the embodiment of the invention shown in Figs. 1 to 12 inclusive is eccentric to the axis of the shaft 20.

The gear segments 28 are adapted to move bodily around the pinion 30 and are also adapted to oscillate on their pivot pins 23. Means is provided for adjusting the segments on their pivots and thereby varying the amplitude of oscillation thereof and the period of engagement of the segments with the pinion. This is accomplished in a manner which will now be described.

The pivot pin 23 of each segment has formed on or secured to one end thereof a crank or arm 35 and each arm 35 has secured thereto adjacent its free end a stud or roller 36.

A sleeve or collar 40 having an enlarged opening 41 therein surrounds the shaft 20 and is supported in and rotatable in a yoke 42 which in turn is supported by a link 43. The yoke 42 has formed thereon guides 42ª slidably mounted in guideways 43ª formed in standards 44ª. The link 43 is carried by one end of a lever 44, the opposite end 45 of the lever being swiveled or pivoted on trunnions 46ª formed on a collar 46. The collar 46 is mounted on a threaded sleeve 48 and is disposed between end flanges 49 on the sleeve. The threaded sleeve 48 has an arm or crank 50 at one end thereof and is threaded on the rod 47. As the arm 50 and sleeve 48 are rotated, the collar 46 will move longitudinally with respect to the rod. The rod 47 is pivoted at 51 to an upright or standard 52.

The lever 44 is pivoted intermediate its ends at 55 to a lever 56 which in turn is pivoted at 57 to an arm 58 which extends between the upright 52 and a lug 59 extending upwardly from the bearing 25.

Means is provided by the lower end of the lever 56 for automatically adjusting the lever 56 and lever 44 and for vertically adjusting the yoke 42 and this means will be described later in the specification.

The sleeve 40 has secured to one end thereof a disk 60 having in the form of the invention shown four radial slots 61. The slots 61 receive the studs or rollers 36 carried by the free ends of the cranks 35. At the opposite end of the sleeve 40 there is secured a plate 65 having a pair of oppositely extending radial slots 66. (See Fig. 5.)

A plate 70 is pinned at 71 to the shaft 20 and has formed therein a pair of oppositely extending radial slots 72. A disk 75 is mounted between the plate 65 and plate 70 and the disk 75 has projecting from one surface thereof studs or rollers 76 positioned in the slots 72 of plate 70 and projecting from the opposite face thereof studs or rollers 77 positioned in the slot 66 of plate 65. The disk 75 as shown in Fig. 8 has an enlarged central opening 79.

The shaft 32 on which the pinion 30 is mounted extends through the bearing 33 and has keyed to its free end as shown at 80 a clutch member 81. The clutch member 81 as shown in Fig. 13 has a plurality of teeth 82 formed therein and a complementary clutch member 83 has corresponding teeth 84 formed thereon. The clutch member 83 is keyed as shown at 85 to a shaft 86, one end of this shaft being reduced as shown at 87 and extending into the hollow shaft 32. The other end of the shaft 86 is journaled in a bearing 88 formed in a support or standard 89.

The clutch member 81 has laterally extending lugs 90 formed thereon at diametrically opposite points and these lugs are connected by springs 91 to corresponding lugs 92 formed on the clutch member 83.

The clutch member 83 has an annular channel 95 formed therein and this channel receives bifurcated end portions 96 formed at the lower end of the lever 56.

Operation

The speed transforming mechanism above described operates as follows:

When the shaft 20 is rotated, the disk 22 also rotates carrying with it the pins 23 and gears or gear segments 28. As these segments move bodily around the pinion 30, the segments are oscillated and their extent or amplitude of oscillation and their period of engagement with the pinion 30 is determined by the adjustment of the yoke 42 and disk 60. The rotation of the shaft 20 also causes the rotation of the plate 70, disk 75 and sleeve 40. As the sleeve 40 is rotated, the disk 60 will also be rotated, thereby oscillating the cranks 35 and oscillating the segments 28 on their pivot pins 23. It will be evident that disk 60 will rotate at the same speed as the drive shaft 20.

With the parts adjusted to the position shown in Figs. 1 to 6 inclusive, the cranks 35 are so positioned as to be in alinement with the center of rotation of the disk 60 and the pinion 30 and shaft 32 will be driven at the same speed as the shaft 20, thus giving approximately a direct drive.

In Fig. 10 the disk 60 has been raised thereby swinging the cranks 35 about their pivots 23 and in this position of adjustment the pinion 30 and shaft 32 will be driven in the same direction as the shaft 20 but at a higher speed.

In Fig. 11 the yoke 42 and plate 60 have been lowered to a position so that the plate will be positioned with its axis below the axis of the shaft 20 and the cranks 35 will be swung about their pivots to such a position that the rotation of the shaft 20, carrying the segments bodily around the pinion, and the oscillation of the segments will cause the segments to roll on the pinion without driving the pinion in either direction. In other words, the segments will oscillate in a clockwise direction about their pivots at the same speed as the segments move around the pinion, thus causing the segments to roll on the pinion without rotating the pinion.

In Fig. 12 the yoke and plate have been shifted to a still lower position, swinging the segments to a still different angle and when the shaft is rotated, the segments will be oscillated in a clockwise direction and will drive the pinion in a direction opposite to the direction of rotation of the shaft 20, thus reversing the drive.

It will be noted that the point of deepest mesh of the segment in mesh with pinion 30 is disposed on a line C D passing through the axis of shafts 20 and through the center of rotation of disk or plate 60.

It will also be noted that lines A B and E F which pass through the centers of segment pivots 23 and crank pins 36 of the segments respectively going out of mesh with pinion 30 and going into mesh with pinion 30, intersects line C D and form equal angles therewith. Furthermore, when the right hand segment in Figs. 10, 11 or 12, moves to the position of the bottom segment, the bottom segment moves to the position of the left hand segment.

Thus the segment going into mesh with the pinion moves through the same angle and at the same rate of speed as the segment going out of mesh therewith and this condition must necessarily be obtained since in order to have a segment constantly in mesh with the pinion one segment must start to move into mesh before the preceding pinion has moved out of mesh.

It will be obvious if two segments mesh with a common gear they must be moving at the same velocity and rate of speed.

In Fig. 14 there is illustrated a modified form of connection between the segment 28$^a$ and the pin 23$^a$. In this form of construction a stud 100 is secured to the pin 23$^a$ and extends into a slot 101 formed in the segment. Springs 102 and 103 are secured to the segment 28$^a$ at their outer ends and engage the stud 100 at their inner ends. Thus a resilient connection is formed between the segment 28$^a$ and the pin 23$^a$ on which the segment is mounted. This resilient connection has for its object to facilitate the engagement of the segment with the pinion 30 in case the teeth of these parts do not readily come into mesh in the first instance.

The clutch 81, 83 operates in a manner to automatically change the ratio between the speed of the drive shaft and the speed of the driven shaft when the load on the driven shaft is changed. For instance, when the load on the shaft 86 increases, the clutch member 83 because of the added load will rotate at a slower speed and by reason of the engagement of the teeth 84 with the teeth 82, the clutch member 83 will move away from the clutch member 81 thereby swinging the lever 56 about its pivot 57. This movement of the lever 56 will cause a movement of the lever 44 in a direction to lower the yoke 42 and disk 60, thus reducing the speed of the driven shaft. In this way, the ratio between the speed of the drive shaft and the speed of the driven shaft will be automatically changed in response to the changes required by the load on the driven shaft.

Figs. 15, 16, 17 and 18 illustrate a modified form of construction. In this construction the shaft 20 carries at its free end a disk 122 having radial slots 123 therein. There is also fixedly mounted on the bearing 25 a ring 124 having a cam groove 125 therein.

In this form of the invention the pins 23 of the segments 28 have their ends positioned in the cam groove 125 and the opposite ends of the pins to which the crank arms 35 are secured extend through the slots 123 of the disk 122. When the shaft 20 is rotated, the pins 23 are guided by the cam groove 125 and move radially in the slots 123 thereby bringing the gear segments 28 into and out of mesh with the pinion 30 carried by the shaft 32. It will be understood that the crank arms are oscillated by the engagement of the studs 36 in the radial slots 61 of the disk 60.

In Fig. 17 the cam groove 125 has a portion 125A of greater curvature than the remaining portion of the groove thereby varying the period of engagement of the gear sectors with the pinion 30.

In Fig. 18 the portion 125B of the cam is flattened.

From the foregoing description it will be seen that simple and practical means has been provided for transforming the speed of a drive shaft to a higher or lower speed and for driving the driven shaft in the same direction as the drive shaft or in a reverse direction. Furthermore, an infinite variety of speed changes can be obtained and such changes can be made during the operation of the mechanism without loss of driving effort or speed during the transitional period.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. Driving mechanism comprising a drive shaft, a driven shaft, a gear on the driven shaft, and a plurality of gears pivotally carried by the drive shaft adapted to mesh successively with the gear on the driven shaft, said gears carried by the drive shaft being movable bodily with the shaft and oscillatable on their pivots with respect to the shaft, and rotatable means for oscillating said gears on their pivots.

2. Driving mechanism comprising a drive shaft, a driven shaft, a gear on the driven shaft, a plurality of gears pivotally carried by the drive shaft adapted to mesh successively with the gear on the driven shaft, said gears carried by the drive shaft being movable bodily with the shaft and oscillatable on their pivots with respect to the shaft, rotatable means for oscillating said gears on their pivots, and means for changing the amplitude of oscillation of said gears.

3. Driving mechanism comprising a drive shaft, a driven shaft, a gear on the driven shaft, a plurality of gears pivotally carried by the drive shaft adapted to mesh successively with the gear on the driven shaft, said gears carried by the drive shaft being movable bodily with the shaft and oscillatable on their pivots with respect to the shaft, rotatable means for oscillating said gears on their pivots, and means for changing the amplitude of oscillation of said gears during the operation of the gearing.

4. In combination, a drive shaft, a driven gear, a plurality of segmental driving gears pivotally carried by said drive shaft and engageable successively with said driven gear and means including a rotatable member having slots for moving said pivoted gears on their pivots to vary the engagement and disengagement of the pivoted gears with the driven gear, said segmental gears having parts connected thereto disposed in said slots.

5. In combination, a drive shaft, a driven gear, a plurality of oscillatable gears carried by the drive shaft and adapted to have variable successive engagement with said gear and automatically operable means for varying the amplitude of oscillation to thereby vary the driving engagement.

6. In combination, a drive shaft, a driven gear, a plurality of oscillatable gears carried by the drive shaft and adapted to have variable successive engagement with said gear and means responsive to the load on the driven gear for varying the amplitude of oscillation to thereby vary the driving engagement.

7. In combination, a drive shaft, a driven gear, a plurality of pivoted gear segments carried by said drive shaft and movable bodily with reference to said gear and oscillatable on their pivots, said segments being successively engageable with the driven gear, means for oscillating said segments during their bodily movement, and means responsive to load conditions on the driven gear for varying the amplitude of oscillation of the gear segments and the period of engagement of the segments with the driven gear.

8. In combination, a drive shaft, a pinion, a plurality of pivoted gears carried by said drive shaft, each pivoted gear being movable bodily with reference to said pinion into and out of engagement therewith and being oscillatable on its pivot, a crank arm connected to each gear pivot, a crank pin on each crank arm, and means for causing said pivoted gears to successively engage said pinion and to oscillate on their pivots, said means including a rotatable member having slots receiving said crank pins.

9. In combination, a drive shaft, a pinion, a plurality of pivoted gears carried by said drive shaft, each pivoted gear being movable bodily with reference to said pinion into and out of engagement therewith and being oscillatable on its pivot, a crank arm connected to each gear pivot, a crank pin on each crank arm, and means for causing said pivoted gears to successively engage said pinion and to oscillate on their pivots, said means including a rotatable member having radial slots receiving said crank pins.

10. In combination a drive shaft, a pinion, a plurality of pivoted gears carried by said drive shaft, each pivoted gear being movable bodily with reference to said pinion into and out of engagement therewith and being oscillatable on its pivot, a crank arm connected to each gear pivot, a crank pin on each crank arm, and means including rotatable means having radial slots receiving said crank pins for causing said pivoted gears to successively engage said pinion and to oscillate on their pivots.

11. Driving mechanism comprising a drive shaft, a driven shaft, a pinion on the driven shaft, a plurality of oscillatable gears carried by and rotatable with the drive shaft, and means including means rotatable at the same speed as the drive shaft for causing said gears to oscillate and to successively engage the pinion.

12. Driving mechanism comprising a drive shaft, a driven shaft, a pinion on the driven shaft, a plurality of oscillatable gears carried by and rotatable with the drive shaft, and means including adjustable means rotatable at the same speed as the drive shaft for causing said gears to oscillate and to successively engage the pinion.

13. In combination, a driving shaft, a disk secured thereto, gear sectors pivoted on said disk, a driven shaft, a pinion thereon adapted to be engaged by said sectors, a speed controlling disk rotatable by said driving shaft and operatively connected to oscillate said sectors on their pivots and to cause said sectors to move successively into and out of mesh with said pinion.

14. In combination, a driving shaft, a disk secured thereto, gear sectors pivoted on said disk, a driven shaft, a pinion thereon adapted to be engaged by said sectors, and means including an adjustable speed controlling disk rotatable by said driving shaft and operatively connected to oscillate said sectors on their pivots.

15. In combination, a driving shaft, a plurality of pivoted gear sectors mounted to revolve therewith, a driven gear engageable by said sectors and rotatable speed control means engaging said sectors and adapted to oscillate said sectors.

16. In combination, a drive shaft, a driven shaft, a pinion on the driven shaft, a plurality of gear sectors rotatable with the drive shaft and engageable with the pinion, and a crank and crank pin connected to each sector and disposed in alinement with the center line of the sector and rotatable means engaging said crank pins for oscillating said sectors.

17. In combination, a drive shaft, a driven shaft, a pinion on the driven shaft, a plurality of gear sectors rotatable with the drive shaft and engageable with the pinion, and a crank and crank pin connected to each sector and disposed in alinement with the center line of the sector and a rotatable member having slots receiving said crank pins for oscillating said sectors.

18. In combination, a pinion, a plurality of pivoted gear segments, means for moving said gear pivots and segments in a circular path, a crank arm connected to each gear pivot, a crank pin on each crank arm, and rotatable means engaging said crank pins for oscillating the segments, said segment moving means and means for oscillating being so constructed and arranged that center lines drawn through the crank pin and gear pivot of a pair of segments equally spaced from a line drawn through the center of the circular path in which the gear pivots travel and the center of rotation of the crank pin oscillating means, will intersect said line at a common point.

19. Driving mechanism comprising a drive shaft, a driven shaft, a gear on the driven shaft, a plurality of gears pivotally carried by the drive shaft adapted to mesh successively with the gear on the driven shaft, said gears carried by the drive shaft being movable bodily with the shaft and oscillatable on their pivots with respect to the shaft, and rotatable means for oscillating said gears on their pivots, said means being so constructed and arranged that the oscillating gear going into mesh with the gear on the driven shaft will oscillate at the same rate of speed as the gear going out of mesh with said driven gear in all positions of movement of said oscillating means, and means for changing the amplitude of oscillation of said gears.

In witness whereof, I have hereunto set my hand this 22d day of August, 1924.

JOSEPH A. ANGLADA.